United States Patent [19]

Tuckey

[11] Patent Number: 5,337,718
[45] Date of Patent: Aug. 16, 1994

[54] ELECTRONIC FUEL INJECTION SYSTEM WITH HEAT-PRESSURE RESPONSE

[75] Inventor: Charles H. Tuckey, Cass City, Mich.

[73] Assignee: Walbro Corporation, Cass City, Mich.

[21] Appl. No.: 160,611

[22] Filed: Nov. 30, 1993

Related U.S. Application Data

[63] Continuation-in-part of Ser. No. 37,031, Mar. 23, 1993, Pat. No. 5,265,644, which is a continuation-in-part of Ser. No. 892,252, Jun. 2, 1992, Pat. No. 5,220,941, and a continuation-in-part of Ser. No. 949,974, Sep. 27, 1992, said Ser. No. 160,611, Continuation-in-part of Ser. No. 151,992.

[51] Int. Cl.⁵ ............................................. F02M 37/04
[52] U.S. Cl. ..................................... 123/464; 123/497
[58] Field of Search ......................... 123/381, 464, 497

[56] References Cited

U.S. PATENT DOCUMENTS

| | | | |
|---|---|---|---|
| 2,984,228 | 5/1961 | Braun et al. | 123/464 X |
| 2,988,077 | 6/1961 | Hottenroth | 123/464 X |
| 3,714,934 | 2/1973 | Mennesson | 123/464 X |
| 3,822,677 | 7/1974 | Reddy | 123/497 |
| 4,635,603 | 1/1987 | Hara | 123/464 X |
| 4,728,264 | 3/1988 | Tuckey . | |
| 4,756,291 | 7/1988 | Cummins et al. . | |
| 4,774,923 | 10/1988 | Hayashi | 123/381 X |
| 4,789,308 | 12/1988 | Tuckey . | |
| 4,800,859 | 1/1989 | Sagisaka et al. . | |
| 4,919,102 | 4/1990 | Iwabuchi . | |
| 4,920,942 | 5/1990 | Fujimori et al. . | |
| 4,951,636 | 8/1990 | Tuckey et al. . | |
| 5,120,201 | 6/1992 | Tuckey et al. . | |
| 5,133,323 | 7/1992 | Treusch . | |
| 5,237,975 | 8/1993 | Betki et al. | 123/497 |

Primary Examiner—Stephen M. Hepperle
Attorney, Agent, or Firm—Barnes, Kisselle, Raisch, Choate, Whittemore & Hulbert

[57] ABSTRACT

A fuel delivery system for an internal combustion engine that includes a fuel supply, an electric motor pump for feeding fuel under pressure from the supply to the engine, a pressure sensitive switch operatively coupled to the pump and having a first contact movably responsive to fuel pressure and a second contact opposed to said first contact, and a PWM amplifier responsive to the pressure sensitive switch for applying electrical power to said pump. The second switch contact is mounted on a bimetallic spring responsive to fuel temperature for altering operating characteristics of the switch, and thereby altering fuel pressure characteristics of said system as a function of fuel temperature.

6 Claims, 1 Drawing Sheet

ELECTRONIC FUEL INJECTION SYSTEM WITH HEAT-PRESSURE RESPONSE

REFERENCE TO CO-PENDING APPLICATION

This is a continuation-in-part of application Ser. No. 08/037,031, filed Mar. 23, 1993, which in turn was a continuation-in-part of Ser. No. 07/892,252, filed Jun. 2, 1992, now U.S. Pat. No. 5,220,941, and a continuation-in-part of application Ser. No. 07/949,974, filed Sep. 27, 1992.

This application is also a continuation-in-part of application Ser. No. 08/151,992, filed Nov. 15, 1993.

FIELD OF INVENTION

Fuel and pressure control with electrical response for fuel supply to fuel injector(s) system of an internal combustion engine.

BACKGROUND OF INVENTION

In the history of automotive vehicles, the furnishing of fuel to the internal combustion engines has had an interesting progression. In the early days, the fuel was fed to the carburetors by a gravity feed system using the vacuum of the manifold. Later, a fuel pump was added in the engine compartment and operated by a rotating cam to pull fuel from the rear fuel tank to the engine carburetor. A later development was the use of a fuel pump driven by an electric motor powered by the vehicle battery. Subsequently, the electrical pumps were developed to be totally enclosed and the pumps were then located in the main fuel tank of the vehicle, usually at the rear of the vehicle. In this location, the fuel system was provided with a pressure regulator wherein, when the fuel demand of the engine was not utilizing the full capacity of the pump, the increased pressure in the fuel line was sufficient to cause the regulator to dump excess fuel into a return line where it was fed back to the main fuel tank.

This pressure regulator return proved to have disadvantages because the return fuel absorbed heat and carried it back to the main fuel tank where it raised the temperature of the main fuel supply. This problem was partially alleviated by installing the fuel pump in a cylindrical upright reservoir within the main fuel tank and directing the return fuel back to the reservoir where it was isolated from the main fuel supply.

The next progression involved the use of an electrical system in conjunction with the pump drive which eliminated the pressure regulator return line and provided for a pump speed regulation responsive to pump outlet pressure. This is described in a U.S. Pat. No. 4,728,264, to Charles H. Tuckey, issued Mar. 1, 1988. These pumps are utilized to deliver fuel to a fuel rail in which electronic fuel injection devices are provided at each engine cylinder to deliver fuel and air at timed intervals.

It will be appreciated that automotive vehicles must operate in many extremes of ambient temperatures. In southern and western states, the ambient temperatures many times may reach 100° F. or higher. When a vehicle is sitting in the sun, especially after it has been operating, the temperatures in the engine compartment and the fuel rail may climb to well over 100° F. Under these conditions, vapor will form in the in-fuel rail and the fuel injectors causing a "hot restart" and rough idle which is unsatisfactory.

An attempt has been made to eliminate this "hot start" problem in non-return systems by installing a check valve in the fuel line downstream from the regulating device. This traps fuel in the fuel rail which causes an immediate pressure rise in the fuel rail and injector area during "engine off" and "hot soak" conditions, that is, a temperature rise in the engine compartment. This pressure rise prevents vaporization but, because of this increase in pressure, a pressure relief valve was installed between the check valve and the fuel rail. One functional disadvantage, however, developed because the pressure regulator valve limits the pressure by dumping fuel. Also, upon restart, the pressure drops quickly to normal pump-regulated pressure but rough idling could result until temperatures normalized.

It is an object of the present invention to eliminate, under hot operating conditions and during restart, the rough idle or engine stumble while maintaining a non-return system and avoiding the bleeding off of fuel dumping. As will be described, this is accomplished by utilizing electric pump control while providing expansion storage capacity for an extended period, thus allowing fuel temperatures to fall before fuel pressure drops to a normal regulated system pressure.

It is a further object to provide a pressure responsive control unit which has a reference passage to an engine manifold land a responsive signal to control pulse width modulation of voltage to a fuel pump.

An overall object is the compensation in the system for high fuel rail temperatures to provide smooth idling and starting of an engine. A further object is the utilization of a heat responsive contact member in conjunction with an electronic circuit in an expansion storage unit in the pulse width modulation element.

Other objects and features of the invention will be apparent in the following description and claims in which the details of the invention are set forth to enable persons skilled in the art to practice the invention, all in connection with the best mode presently contemplated for the invention.

BRIEF DESCRIPTION OF THE DRAWINGS

Drawings accompany the detailed description and the various views thereof may be briefly described as follows.

DETAILED DESCRIPTION

Figure 1:
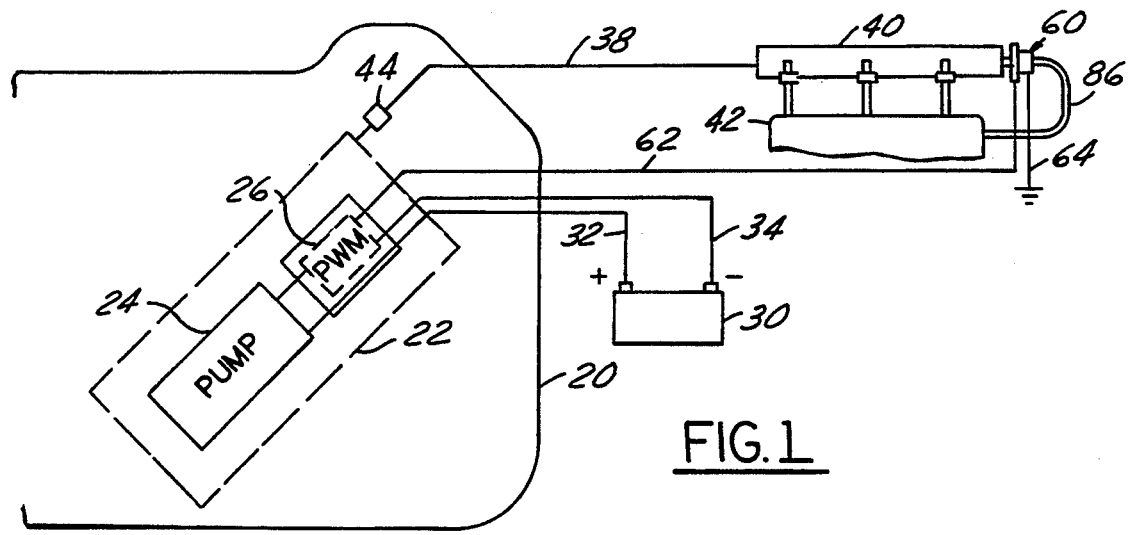
FIG. 1 is a schematic view of a fuel rail and control system with a pressure controller.

In FIG. 1, a vehicle main fuel tank 20 is shown diagrammatically with an in-tank fuel reservoir 22. Within the reservoir is an electrically-operated fuel pump 24 of the type shown, for example, in U.S. Pat. No. 4,697,995 issued to Charles H. Tuckey on Oct. 6, 1987. A pulse width modulator unit 26 is associated with the pump control circuit in a circuit illustrated in application, Ser. No. 08/037,031, now U.S. Pat. No. 5,265,644.

The pump 24 and the pulse width modulator 26 are connected in a circuit with a source battery 30 through lines 32 and 34. A pump outlet line 38 leads to a fuel rail 40 on an engine. The fuel rail contains fuel injectors for the individual cylinders of the engine. A safety pressure relief valve 44 may be interposed on line 35 to avoid excessive pressure due to system disfunction.

At the right hand end of the fuel rail, as viewed in FIG. 1, a control and expansion storage unit 60 is illustrated, electrically connected to the pulse width modulator 26 by a line 62 and grounded by a line 64. The detailed construction of the storage unit 60 is illustrated in various functional stages in FIGS. 2 to 4.

The storage and control unit 60 has a non-conductive annular base 70 with a chamber 72. A central bore in the base surrounded by a nipple connector 74 opens to the chamber 72. This nipple is in communication with the interior of the fuel rail. A cup-shaped cylindrical housing element 76 has an extending flange 78 with a portion overlying and spun into tight contact with an annular lip 80 on the base 70. An O-ring seal 82 seals the flange 78 to the base 70. The top 70 of the storage unit 60 has a connector nipple 84 which connects to the air intake manifold of the engine 42 through a tube 86 (FIG. 1). A depression around the nipple 84 forms a spring seat for a metal coil spring 86. The cup 76 is formed of electrically conductive metal.

The periphery of a diaphragm 90 is captured in sealing relationship between the flange 78 and the O-ring seal 82. This diaphragm extends across the chamber 72 and has an involute fold 92 which rises in an annular space between the inner wall of the cup 76 and the outer wall of a movable cup 96 forming a bottom seat for the coil spring 86. The inner cud 96 is also formed electrically of conductive material and has a metal contact insert 100 secured therein with a downwardly extending contact point 102.

At the bottom of the chamber 72 in the base 70 is a bimetallic, electrically conductive U-shaped leaf spring 109 having one leg 110 fastened by a contact pin 112 extending through the bottom wall of the base 70. This contact pin 112 is connected to line 62 extending from the pulse width modulator. The conductive housing 76 is connected to ground wire 64. The leaf spring in chamber 72 has an upper leg 114 with a free end adjacent and opposed to contact point 102.

In the operation of the pressure controller rail mount, the various positions of the contact element, that is, leaf spring 109 and the contacts 100, as well as the positions of the cup 96 in the reservoir chamber 76, are shown.

Figure 2:
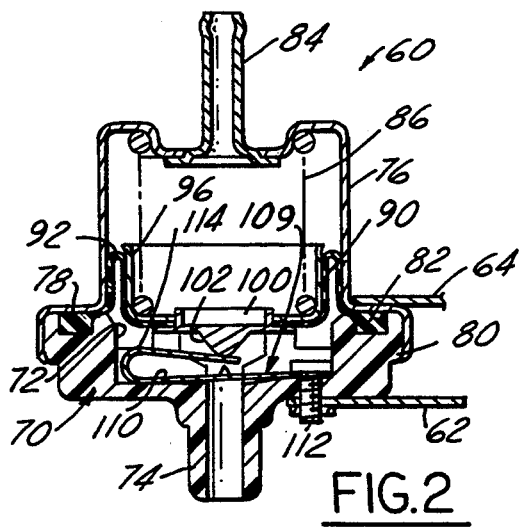
FIG. 2 is a sectional view of a pressure controller unit in a resting position.

In FIG. 2, the parts are shown in system-off resting position—i.e., no fuel pressure and cool temperature. The bimetallic leaf spring 109 is responsive to the temperature in the fuel rail and the legs 110,114 contract toward each other under cool conditions. The spring leg 114 is in contact with the upper contact point 102. Line 62 is thus connected to ground 64 through terminal 112, spring 109, contact 100, cup 96, spring 86 and top 76. When the ignition key is turned to "on" the pump 24 will initiate operation.

Figure 3:
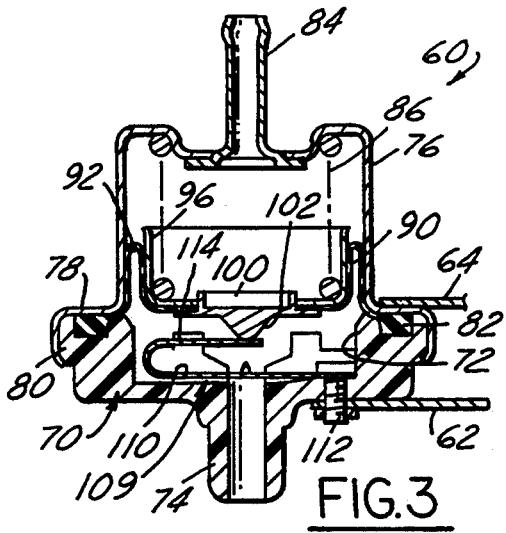
FIG. 3 is a view similar to FIG. 2 with the part in a normal operating position.
Figure 4:
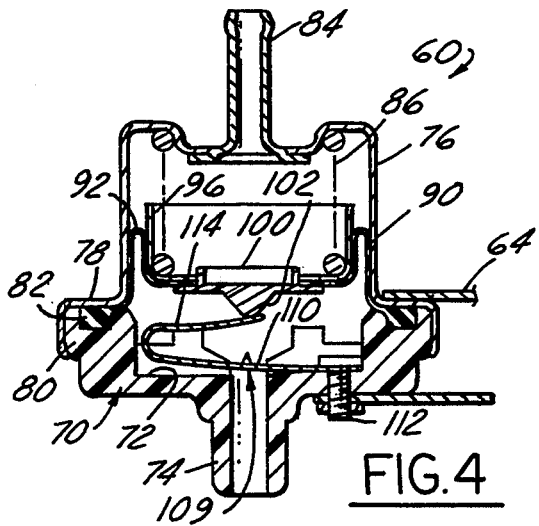
FIG. 4 is a view similar to FIG. 2 with the parts in an elevated temperature position.
Figure 5:
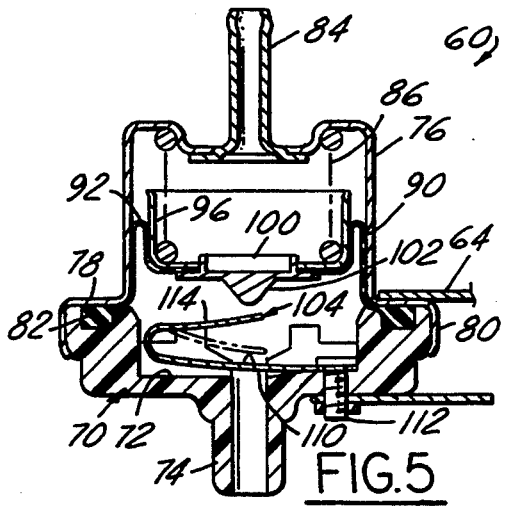
FIG. 5 is a view similar to FIG. 2 with the parts in an over pressure position.

In FIG. 3, the parts are shown in normal operating position—i.e., normal operating pressure and temperature. Leg 114 and point 102 are in contact, but the fuel pressure from port nipple 74 has moved diaphragm 90 and cup 96 upwardly a short distance against spring 86. In FIG. 4, there is a condition of elevated temperature where it will be seen, the cup 96 is raised higher and the leg 114 is higher because of the increased temperature but still in a position to contact point 102. In FIG. 5, the cup 96 has been raised to a high position by the pressure in the fuel rail and under these conditions, the contact point 102 is above the expanded leaf spring leg 114 to break the circuit to the pump, thus reducing the pressure in the fuel rail.

Thus, as fuel pressure increases, cup 96 is moved upwardly (in the orientation of FIGS. 2-5) until contact between point 102 and spring leg 114 is broken, whereupon pump operation terminates and fuel pressure declines. At low fuel temperature, this threshold pressure will be relatively low because the bimetallic spring legs 110,114 are biased toward each other. However, as fuel temperature increases, the spring legs 110,114 are urged apart by the bimetallic properties of spring 109, so that the pressure at which contact is broken between point 102 and spring 109 increases accordingly. Thus, spring 109 functions automatically to increase fuel pressure as temperature increases above the low-temperature threshold at which the bimetallic properties of the spring begin to take effect. The functional relationship between increasing pressure and temperature above this threshold—e.g., linear, non-linear, step function, etc.—are determined by design of spring 109.

It will be appreciated that there may be make and break contacts during each phase of the operation so the pump operation may be intermittent as the cup 96 lifts and the leg 114 follows depending on temperature.

I claim:

1. A fuel delivery system for an internal combustion engine that includes a fuel supply, an electric motor pump for feeding fuel under pressure from the supply to the engine, and means for applying electrical power to the pump comprising:

pressure sensitive switch means operatively coupled to the pump and having a first contact movably responsive to fuel pressure and a second contact opposed to said first contact, and means responsive to said pressure sensitive switch means for applying electrical power to said pump, characterized in that one of said first and second contacts includes means responsive to fuel temperature for altering operating characteristics of said switch means, and thereby altering fuel pressure characteristics of said system as a function of fuel temperature.

2. The system set forth in claim 1 wherein said temperature-responsive means comprises bimetallic means for altering position of said one of said contacts with respect to the other as a function of fuel temperature.

3. The system set forth in claim 2 wherein said bimetallic means comprises a bimetallic spring on which said second contact is disposed.

4. The system set forth in claim 3 wherein said switch means is disposed in a housing having inlet means for admitting fuel under pressure, said first contact being mounted on a diaphragm for contact with fuel within said housing, and said second contact being mounted on said bimetallic spring, with both said second contact and said spring being surrounded by fuel within said housing.

5. The system set forth in claim 4 wherein said power-applying means comprises pulse width modulation means for applying pulsed d.c. energy to the pump at a first level when said first and second contacts are closed, and at a second level less than said first level when said first and second contacts are open.

6. The system set forth in claim 5 wherein said second level is equal to zero.

* * * * *